J. T. GRAVES.
COMBINED STALK CUTTER AND CART.
APPLICATION FILED JUNE 21, 1909.

948,854.

Patented Feb. 8, 1910.
2 SHEETS—SHEET 1.

J. T. GRAVES.
COMBINED STALK CUTTER AND CART.
APPLICATION FILED JUNE 21, 1909.

948,854.

Patented Feb. 8, 1910.

2 SHEETS—SHEET 2.

Witnesses

Inventor
J. T. Graves
By A. S. Pattison
Attorney

UNITED STATES PATENT OFFICE.

JAMES THOMAS GRAVES, OF WILSON, NORTH CAROLINA.

COMBINED STALK-CUTTER AND CART.

948,854.  Specification of Letters Patent.  Patented Feb. 8, 1910.

Application filed June 21, 1909. Serial No. 503,415.

*To all whom it may concern:*

Be it known that I, JAMES T. GRAVES, a citizen of the United States, residing at Wilson, in the county of Wilson and State of North Carolina, have invented certain new and useful Improvements in Combined Stalk-Cutters and Carts, of which the following is a specification, reference being had therein to the accompanying drawing.

My invention relates to improvements in combined stalk cutters and cart.

The object of my invention is to provide a cart which can be readily converted into a stalk cutter and thus combining a cart and cutter into a single implement.

Another object of my invention is to provide a more simple, cheap and effective cart of this character.

Figure 1:
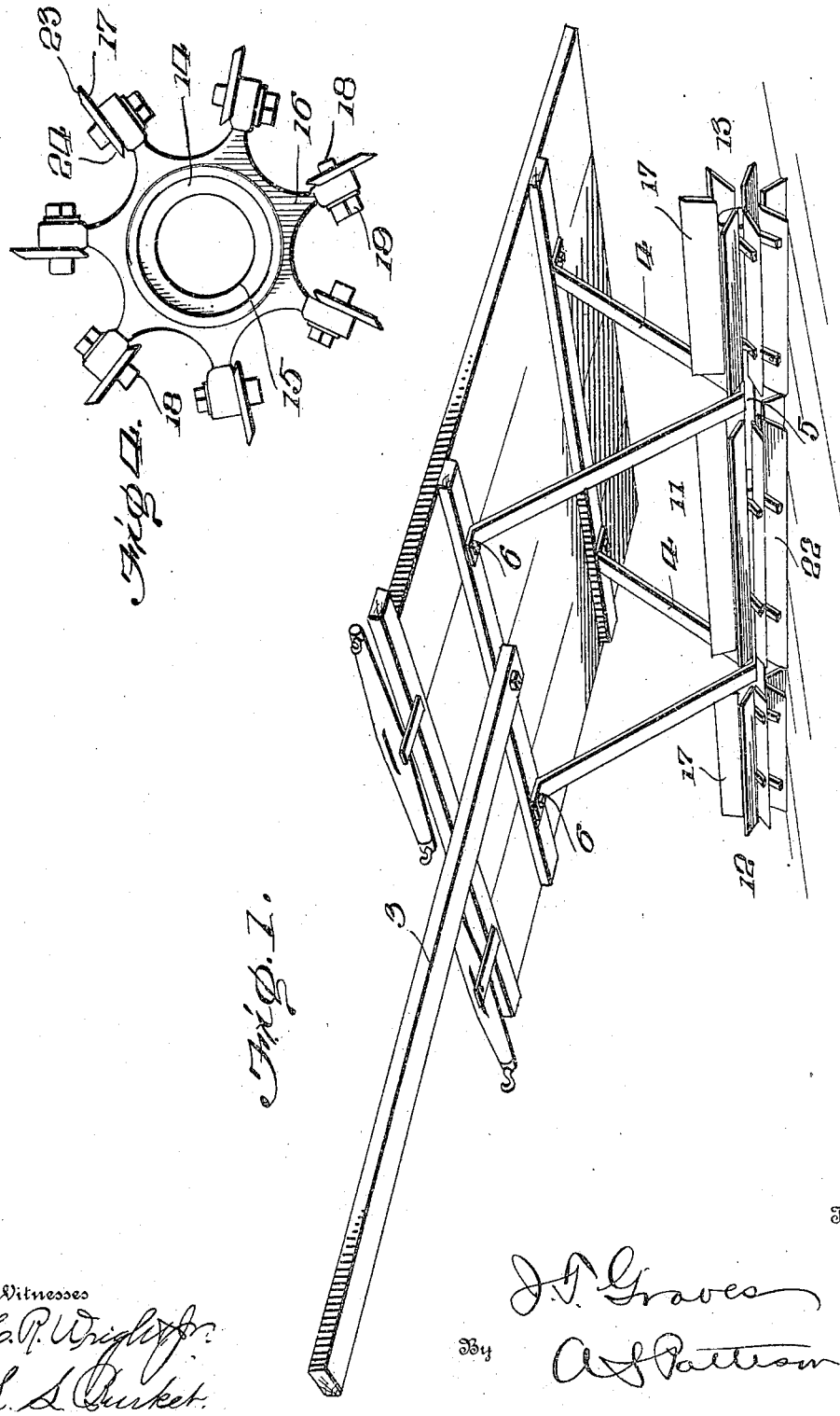
Figure 2:
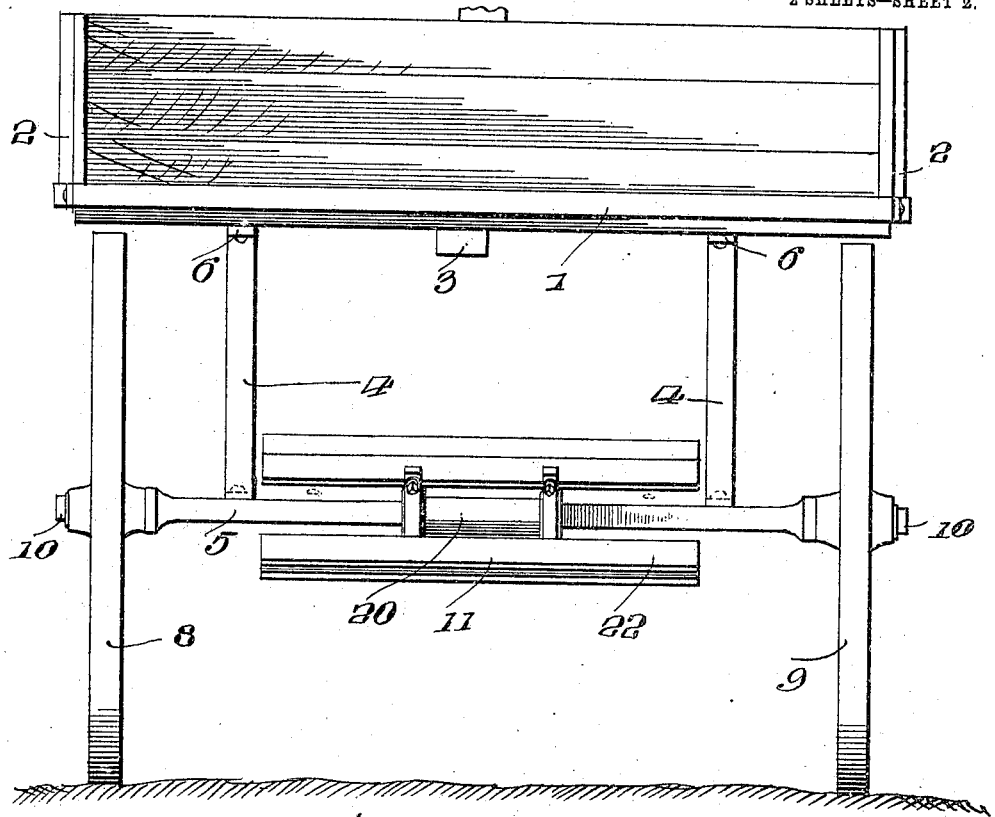
Figure 3:
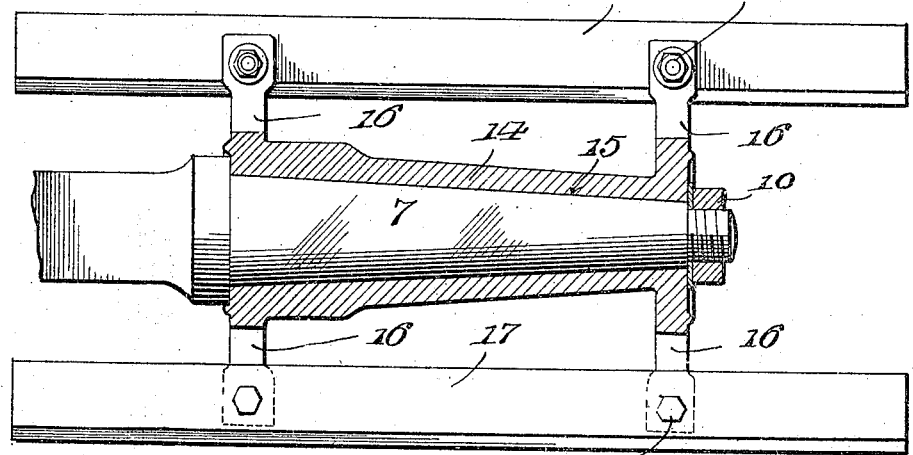

In the accompanying drawings—Figure 1 is a perspective view looking from underneath when used as a stalk cutter. Fig. 2 is an end view of Fig. 1 showing the wheels applied when used as a cart. Fig. 3 is an enlarged longitudinal sectional view of one of the cutters showing it applied to the spindle of the cart. Fig. 4 is an enlarged end view of the cutter.

Trucks of this character are used for conveying the cotton or tobacco from the field to the storing sheds, and by my arrangement of the several parts it will be seen that the cutters can be applied and the one implement serve the two purposes.

Referring now to the drawings, 1 represents the body or platform of my improved combined implement and which, if desired, may be provided with the removable sides 2, whereby it is converted into a wagon-body or a flat truck. The body portion is provided with a pole 3 by means of which the cart is drawn. The detail structure of this body, etc., need not be further described, but it is built principally for lightness to lighten the draft of the vehicle when used as a cart when drawing it over a plowed field in collecting the tobacco. Secured to the bottom of the main body 1, are the metal straps or brackets 4, two in number, and which extend downwardly and to which are secured the axle 5. The straps or brackets, as shown, are V-shaped and have their outer ends turned outwardly as indicated at 6, and by means of which the straps are rigidly secured to the main body or platform. The axle 5 is rigidly secured to the lower end of the straps, as shown, and thus the axle is held against rotation. The axle 5 may be made of any desired length, but it is preferably of a length to straddle one row of stalks and the outer ends or spindles 7 being directly over the rows on each side, whereby as shown the device when used as a cutter is adapted to cut three rows of stalks. While I have shown and described the axle of a length so that it straddles one and the spindles are above the two adjoining rows it will be understood that the axle can be of a length so that it will simply reach between two rows and with the spindle directly above the said two rows of stalks.

Mounted upon the spindles 7 are the wheels 8 and 9 held thereon by nuts 10 in the usual manner, all of which needs no further description, and when the wheels are on the spindles the implement is adapted to be used as a cart for the purposes set forth or for any other purpose which a light cart is used. Carts of this character are used in the cotton or tobacco fields as they can be more readily turned and are lighter.

Between straps or brackets 4 and mounted upon the axle 5 is a rotary central cutter 11, which is free to rotate upon the axle and held upon the axle against longitudinal movement in any desired manner. The said cutter is of a diameter considerably less than that of the wheels 8 and 9 and whereby it is supported far above the ground when used as a cart as shown in Fig. 2 of the drawings.

When it is desired to use the cart as a cutter the wheels 8 and 9 are removed and the two cutters 12 and 13 are placed thereon. These cutters are constructed with a hub 14 having a bore 15 therethrough of the same shape as the bore of the hub-boxing, and said hub 14 fits thereon and freely rotates. The said hub is held thereon by the same nuts 10 that hold the wheels on the axle and whereby the wheels and the cutters are readily interchangeable. The hub is preferably of cast metal and having cast integral therewith the outwardly extending arms 16, which are provided with openings at their outer ends. The hub 14 is of an elongated form, as shown in Fig. 3, and is provided at each end with the arms 16 which are oppositely arranged. The arms are seven in number at each end of the hub and secured to the outer ends of these arms are the cutter blades 17, which are of elongated form and each blade is secured to an arm carried by opposite ends of the hub, as shown in Fig. 3. These cutters are preferably secured to the arms by the bolts 18 passing through the arms and the blades and having the nuts 19 thereon whereby the blades may be readily removed when desired.

The axle 5 is seven feet six inches from the center of one spindle to the center of the other spindle, and the hubs mounted on the spindle. The blades 17, as shown, extend equal distances on the inside and outside of the hub and as the distance apart of every third row of stalks is seven feet, it will be seen that the blades 17 will cut the stalks. The blades as shown in Fig. 3 extend a considerable distance beyond the inner and outer ends of the hubs and the blades will extend some distance on each side of the stalk rows and thus will provide for a variation in the width of the rows. The outside cutters extend inwardly adjacent the brackets and leaving only space enough on the outside of the bracket to allow the free rotation of the cutter.

The axle between the brackets 4 is provided with a bearing portion upon which is mounted the hub 20 of the center cutter 11. This cutter is constructed the same as the end cutter except that the hub has a straight bore and the blades 22 are considerably longer than the end blades. These center blades 22 extend outwardly to the braces 4 and having only space enough to allow for the free rotation of the cutter. By this arrangement of the cutters it will be seen that the cutters extend practically across the entire device and not only cut the stalks but also chop the ground and places it in condition for sowing a crop of grass, or cow peas thereon and also cuts all the weeds and grass from between the rows. The blades each have two cutting edges 23 and 24, whereby they may be reversed so as to bring either of the cutting edges into action by removing the bolts 18.

The blades are seven in number or the same in number as the arms, and by placing these blades close together the stalks will be more readily cut without missing any of them and also absolutely cause the rotation of the hub by the engagement of the blades with the ground. While greater or fewer knives could be used, it has been found that the number shown gives the best results.

The pole 3, as shown, is secured to the underside of the platform 1, and the swingletrees 25 and 26 are attached to the platform. While I have shown and described a pole, it will be understood that shafts could be attached when it is desired to use a single horse without changes of the other part of the device.

While I have shown and described my device as being used for a three row stalk cutter, it will be understood that the axle can be shortened and the device used for cutting two rows of stalks. In this event the center cutter could be omitted or used as described, but in each event the cutter or the blades of the cutters would have to be shortened.

Having thus described my invention, what I claim and desire to secure by Letters Patent is:

1. A combined cart and stalk cutter, comprising a body-portion, an axle carried thereby and having spindles at its outer ends, and adapted to receive either the cutters or wheels and a rotatable cutter mounted upon the axle intermediate the spindles.

2. A combined cart and stalk cutter, comprising a body portion, downwardly extending brackets carried by the body-portion, an axle secured to said brackets, and having the usual spindles at its outer ends, and adapted to receive either cutters or wheels, and a rotary cutter mounted upon the axle between the brackets.

3. A combined cart and stalk cutter, comprising a body-portion, downwardly extending brackets carried by the bottom, a cutter mounted upon the axle between said brackets, and spindles carried by the outer ends of the axle, and cutters adapted to fit said spindles and removably held thereon.

4. A stalk cutter, comprising a body-portion, an axle carried thereby, a cutter carried by the axle intermediate its ends, the outer ends of the axle having spindles, cutters comprising a hub portion adapted to fit the spindle, nuts holding the hubs thereon in the usual manner, integral radial arms carried by the hubs at each end, and cutter-blades bolted to the outer ends of the arms and extending a considerable distance beyond the inner and outer ends of the hubs, said cutter blades having inner and outer cutting edges whereby the blades may be reversed.

In testimony whereof I affix my signature in presence of two witnesses.

JAMES THOMAS GRAVES.

Witnesses:
W. G. LUCAS,
R. S. BARRUS.